(12) United States Patent
Hanlin et al.

(10) Patent No.: US 10,661,651 B2
(45) Date of Patent: May 26, 2020

(54) CNG FUEL SYSTEM FOR A VEHICLE

(71) Applicant: Shem, LLC, Hagerstown, IN (US)

(72) Inventors: Thesa Hanlin, Winchester, IN (US);
Shane Leppan, Brackenfell (ZA)

(73) Assignee: Shem, LLC, Hagerstown, IN (US)

( * ) Notice: Subject to any disclaimer, the term of this patent is extended or adjusted under 35 U.S.C. 154(b) by 257 days.

(21) Appl. No.: 15/457,270

(22) Filed: Mar. 13, 2017

(65) Prior Publication Data

US 2017/0246951 A1    Aug. 31, 2017

Related U.S. Application Data

(63) Continuation of application No. 14/060,332, filed on Oct. 22, 2013, now Pat. No. 9,592,731.

(51) Int. Cl.
*B60K 15/07* (2006.01)
*B60K 15/03* (2006.01)
(Continued)

(52) U.S. Cl.
CPC ........ *B60K 15/07* (2013.01); *B60K 15/03006* (2013.01); *F02M 21/023* (2013.01); *F02M 21/029* (2013.01); *F02M 21/0215* (2013.01); *F02M 21/0224* (2013.01); *F02M 21/0245* (2013.01); *F17C 13/04* (2013.01); *F17C 13/08* (2013.01); *B60K 2015/03013* (2013.01); *B60K 2015/03019* (2013.01); *B60K 2015/0319* (2013.01); *B60K 2015/03026* (2013.01); *B60K 2015/03131* (2013.01); *B60K 2015/03309* (2013.01); *B60K 2015/03335* (2013.01); *B60Y 2200/144* (2013.01); *F02D 19/023* (2013.01); *F02D 19/027* (2013.01); *F17C 2221/033* (2013.01); *F17C 2223/0123* (2013.01); *F17C 2223/036* (2013.01); *F17C 2225/0123* (2013.01); *F17C 2225/035* (2013.01);
(Continued)

(58) Field of Classification Search
CPC .. F17C 13/04; F02M 21/029; F02M 21/0215; B60K 15/03006
See application file for complete search history.

(56) References Cited

U.S. PATENT DOCUMENTS 3,884,255 A   5/1975  Merkle
4,013,300 A   3/1977  Berger
(Continued)

*Primary Examiner* — Angelisa L. Hicks
(74) *Attorney, Agent, or Firm* — Banner & Witcoff, Ltd.

(57) ABSTRACT

A fuel management module for use with a CNG fuel system for a vehicle includes a housing configured to be connected to the vehicle and a number of connections, receptacles, and controls associated with the module. A defueling receptacle may be positioned on the front panel of the housing, for defueling a fuel tank of the vehicle. A defueling control valve may be positioned on the front panel of the housing for controlling operation of the defueling receptacle, allowing for selective defueling. One or more high pressure connections may be accessible on the housing and configured for connection to one or more separate fuel tanks in a plug and play configuration. A plurality of filling connections may be accessible on the housing for filling the fuel tank(s). A low pressure fuel output connection may be positioned on the back panel of the housing to provide fuel output from the high pressure connections to the engine.

24 Claims, 13 Drawing Sheets

(51) Int. Cl.
*F02M 21/02* (2006.01)
*F17C 13/04* (2006.01)
*F17C 13/08* (2006.01)
*F02D 19/02* (2006.01)

(52) U.S. Cl.
CPC .. *F17C 2227/041* (2013.01); *F17C 2227/046* (2013.01); *F17C 2250/043* (2013.01); *F17C 2250/0491* (2013.01); *F17C 2265/066* (2013.01); *F17C 2270/0171* (2013.01); *Y02T 10/32* (2013.01); *Y10T 137/474* (2015.04)

(56) References Cited

U.S. PATENT DOCUMENTS

| | | | |
|---|---|---|---|
| 4,231,708 A * | 11/1980 | Telesio | B60K 5/10 105/133 |
| 4,854,406 A | 8/1989 | Appleton et al. | |
| 4,860,785 A * | 8/1989 | Sundstrom, Jr. | F02M 37/0023 137/351 |
| 5,255,699 A * | 10/1993 | Herzan | F16L 37/23 137/1 |
| 5,409,046 A * | 4/1995 | Swenson | F17C 9/02 141/11 |
| 5,806,892 A | 9/1998 | Colburn | |
| 5,890,512 A * | 4/1999 | Gotthelf | G05D 16/0663 137/375 |
| 6,026,974 A | 2/2000 | Burt | |
| 6,062,254 A * | 5/2000 | Brady | F16K 51/00 137/347 |
| 6,502,660 B1 * | 1/2003 | Scott | B60K 15/013 137/267 |
| 6,722,839 B2 | 4/2004 | Bingman | |
| 7,445,078 B2 | 11/2008 | Dolesh et al. | |
| 2006/0162810 A1 * | 7/2006 | Eshenour | B67D 7/0266 141/285 |
| 2011/0272045 A1 | 11/2011 | Matsukawa | |
| 2011/0288738 A1 | 11/2011 | Donnelly et al. | |
| 2012/0161430 A1 | 6/2012 | Mulanon | |
| 2012/0266987 A1 * | 10/2012 | Jaasma | F02D 19/0647 137/602 |
| 2012/0280481 A1 | 11/2012 | Gentry | |
| 2013/0234515 A1 | 9/2013 | Boone | |
| 2013/0255808 A1 * | 10/2013 | Ninomiya | F02M 21/0239 137/624.27 |

* cited by examiner

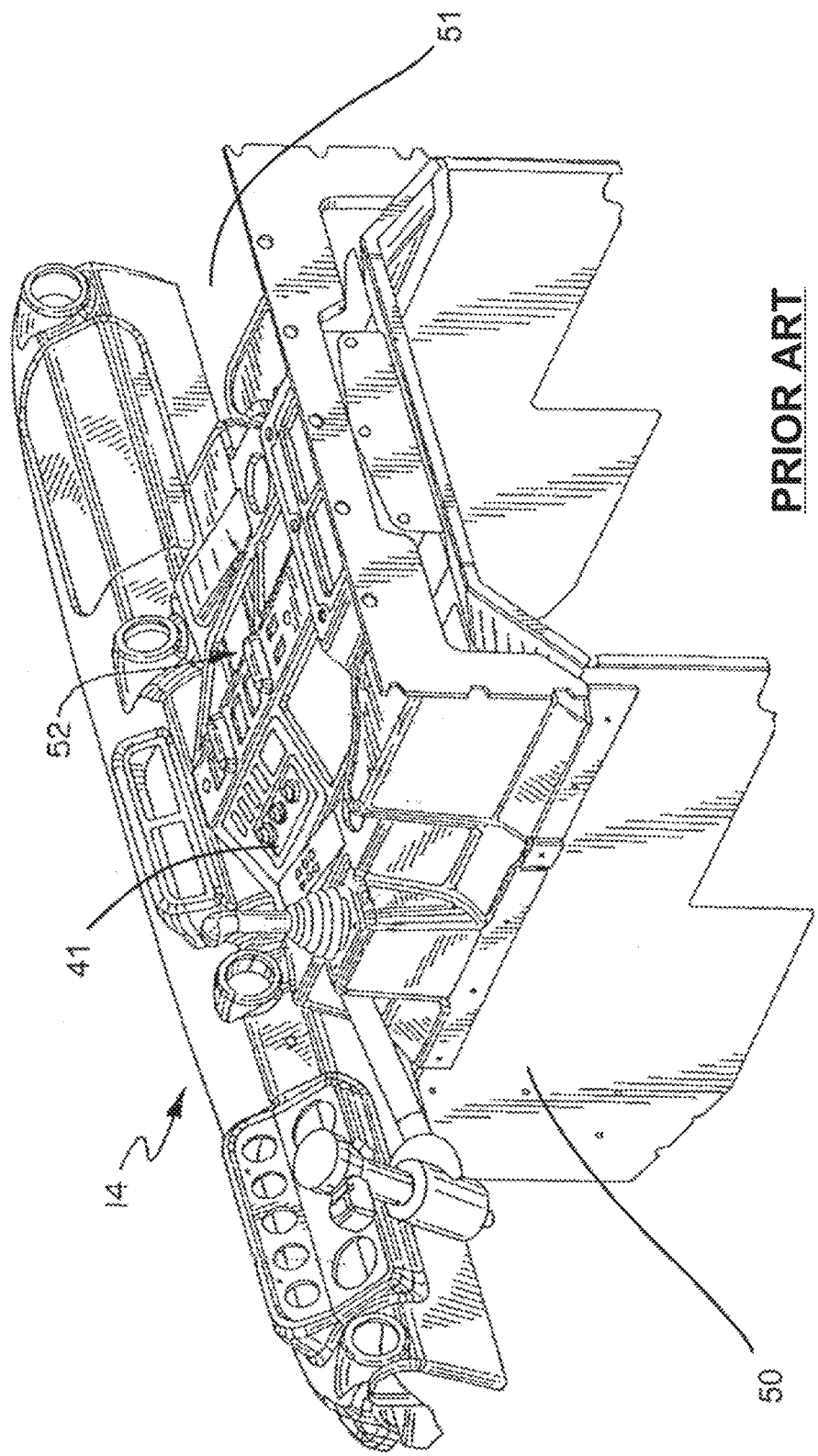

CNG FUEL SYSTEM FOR A VEHICLE

CROSS-REFERENCE TO RELATED APPLICATION

The present application is a continuation from U.S. patent application Ser. No. 14/060,332, filed Oct. 22, 2013, and the present application claims priority to and the benefit of such application, which is incorporated by reference herein in its entirety and made part hereof.

TECHNICAL FIELD

The present invention generally relates to CNG fuel system for a vehicle and more particularly to a CNG fuel system that provides a number of different fueling configurations for a refuse truck or other vehicle.

BACKGROUND

Compressed natural gas (CNG) is becoming more widely used for powering various different types of vehicles, due at least in part to the fact that CNG is a relatively economical, efficient, and environmentally favorable source of energy. Refuse trucks and other fleet-type vehicles have increasingly been outfitted with engines and fuel systems configured for CNG. However, refuse trucks are typically manufactured in a multi-step process, with an OEM manufacturing a portion of the truck and a second entity completing the manufacturing process, which can cause difficulties with powering and moving the truck in the middle of the manufacturing process. For example, the OEM may manufacture a vehicle that includes the chassis, axles, wheels, drivetrain, and operator cab, and a body outfitter may later mount the body and associated hydraulics, electronics, etc., on the vehicle. The main fuel tanks are often connected to the chassis by the body outfitter as well, leaving the vehicle without power for movement during transfer to the body outfitter. Additionally, existing fuel systems for CNG vehicles are generally set up for specific fueling configurations and do not provide freedom for connecting different types and configurations of fuel tanks.

Thus, while certain refuse hauling trucks and other vehicles and fuel systems for such vehicles according to existing designs provide a number of advantageous features, they nevertheless have certain limitations. The present invention seeks to overcome certain of these limitations and other drawbacks of the prior art, and to provide new features not heretofore available.

BRIEF SUMMARY

Aspects of the invention relate to a refuse truck or other vehicle that includes a chassis supporting a truck body and an operator cab and being connected to a plurality of wheels. The chassis has a front portion supporting the operator cab and a rear portion supporting the truck body, with the rear portion having a pair of rails extending rearward from the front portion toward a rear of the truck. An engine is supported by the chassis and configured for utilizing CNG fuel. A first CNG fuel tank mounted on the chassis, and a second CNG fuel tank is mounted on the truck body. The vehicle further has a fuel management system that includes a fuel management module mounted on one of the rails of the chassis, with the fuel management module having first and second high pressure connections, a filling connection in communication with the first and second high pressure connections, and a low pressure fuel output connection in communication with the first and second high pressure connections. A first conduit connects the first fuel tank to the first high pressure connection of the fuel management module and is configured for outputting and receiving fuel to and from the first fuel tank. A second conduit connects the second fuel tank to the second high pressure connection of the fuel management module and is configured for outputting and receiving fuel to and from the second fuel tank. A third conduit is connected to the low pressure fuel output connection and connected to the engine of the vehicle to provide fuel output from the low pressure fuel output connection to the engine. The first and second high pressure connections are in communication with the low pressure fuel output connection for transferring fuel from the first and second fuel tanks to the engine. The filling connection is in communication with the first and second high pressure connections and is configured to receive input of fuel for filling the first and second fuel tanks through the first and second conduits.

Additional aspects of the invention relate to a fuel management module for use with a CNG fuel system for a vehicle, including a housing configured to be connected to the vehicle, the housing having an outer surface and a hinged door configured to be moved to cover and uncover a front panel of the housing, and a number of connections, receptacles, and controls associated with the module. A defueling receptacle may be positioned on the front panel of the housing, and the defueling receptacle is configured for connection to defuel a fuel tank of the vehicle. A defueling control valve may be positioned on the front panel of the housing, and the defueling control valve is configured for selecting among different operations of the defueling receptacle. One or more high pressure connections may be accessible on the housing, with each of the first and second high pressure connections configured for connection to separate fuel tanks in a plug and play configuration. A plurality of filling connections may be accessible on the housing, with the filling connections being in communication with the first and second high pressure connections, such that the filling connections are configured to receive input of fuel for filling the separate fuel tanks through the first and second high pressure connections. A low pressure fuel output connection may be positioned on the back panel of the housing, with the low pressure fuel output connection being in communication with the first and second high pressure connections and configured for connection to an engine of the vehicle to provide fuel output from the first and second high pressure connections to the engine.

According to one aspect, the defueling control valve may be configured for selecting among different operations including defueling through the defueling receptacle, closed valve with no defueling, and venting of fuel trapped in a conduit between the defueling control valve and the defueling receptacle. The module may further include individual fuel valves configured for selectively opening and closing fuel flow to each of the separate fuel tanks. Such fuel valves may include manual valves configured for selectively opening and closing fuel flow in a manual manner, solenoid valves configured for selectively opening and closing fuel flow in an automated manner, or a combination of such fuel valves.

Further aspects of the invention relate to a refuse truck or other vehicle that includes a chassis connected to a plurality of wheels, the chassis having a front portion and a rear portion, with the rear portion configured for supporting a truck body, an operator cab supported by the front portion of the chassis, an engine supported by the chassis and configured for utilizing CNG fuel, and a fuel management module supported by the chassis. The fuel management module has a high pressure connection configured for connection with a fuel tank, a filling connection in communication with the high pressure connection for filling the fuel tank, and a low pressure fuel output connection in communication with high pressure connection and connected to the engine, with the low pressure fuel output connection configured to provide fuel output to the engine. The vehicle further includes a vehicle control system at least partially accessible within the operator cab and configured for controlling at least one operating parameter of the body, wherein the vehicle control system is connected to the fuel management module and configured for controlling at least one operating parameter of the fuel management module.

Still further aspects of the invention relate to a refuse truck or other vehicle that includes a chassis connected to a plurality of wheels, the chassis having a front portion and a rear portion, with the rear portion configured for supporting a truck body, a front axle and a rear axle supported by the chassis, a plurality of wheels supported by the front and rear axles, an operator cab supported by the front portion of the chassis, an engine supported by the chassis and configured for utilizing CNG fuel, and a fuel management module supported by the chassis. The fuel management module has a high pressure connection configured for connection with a main fuel tank, a filling connection in communication with the high pressure connection for filling the main fuel tank, and a low pressure fuel output connection in communication with the high pressure connection and connected to the engine, with the low pressure fuel output connection configured to provide fuel output to the engine. A mounting structure is connected to the chassis and extends upward from the chassis behind the operator cab, and a temporary fuel tank is supported by the mounting structure. The temporary fuel tank is connected to the high pressure connection of the fuel management module to supply fuel to the engine. No portions of the mounting structure and the temporary fuel tank are positioned rearwardly beyond a vertical plane located 23 inches rearwardly from the front axle.

Other features and advantages of the invention will be apparent from the following description.

BRIEF DESCRIPTION OF THE DRAWINGS

To understand the present invention, it will now be described by way of example, with reference to the accompanying drawings in which:

FIG. 1A is a perspective view of an interior of an operator cab of a vehicle according to one embodiment of the present invention in the form of a refuse truck;

Figure 1:
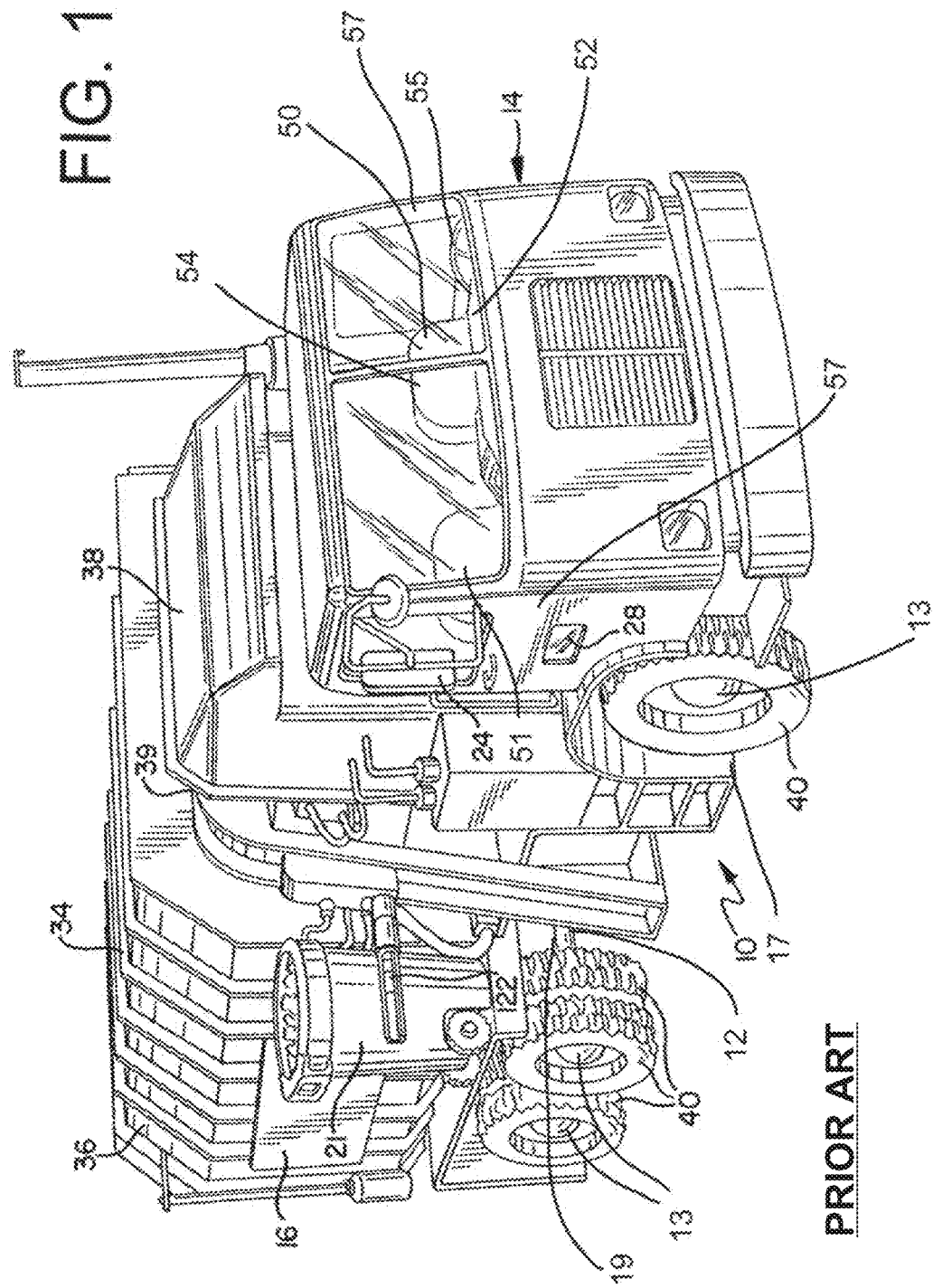
FIG. 1 is a perspective view of a vehicle according to one embodiment of the present invention in the form of a refuse truck.
Figure 2:
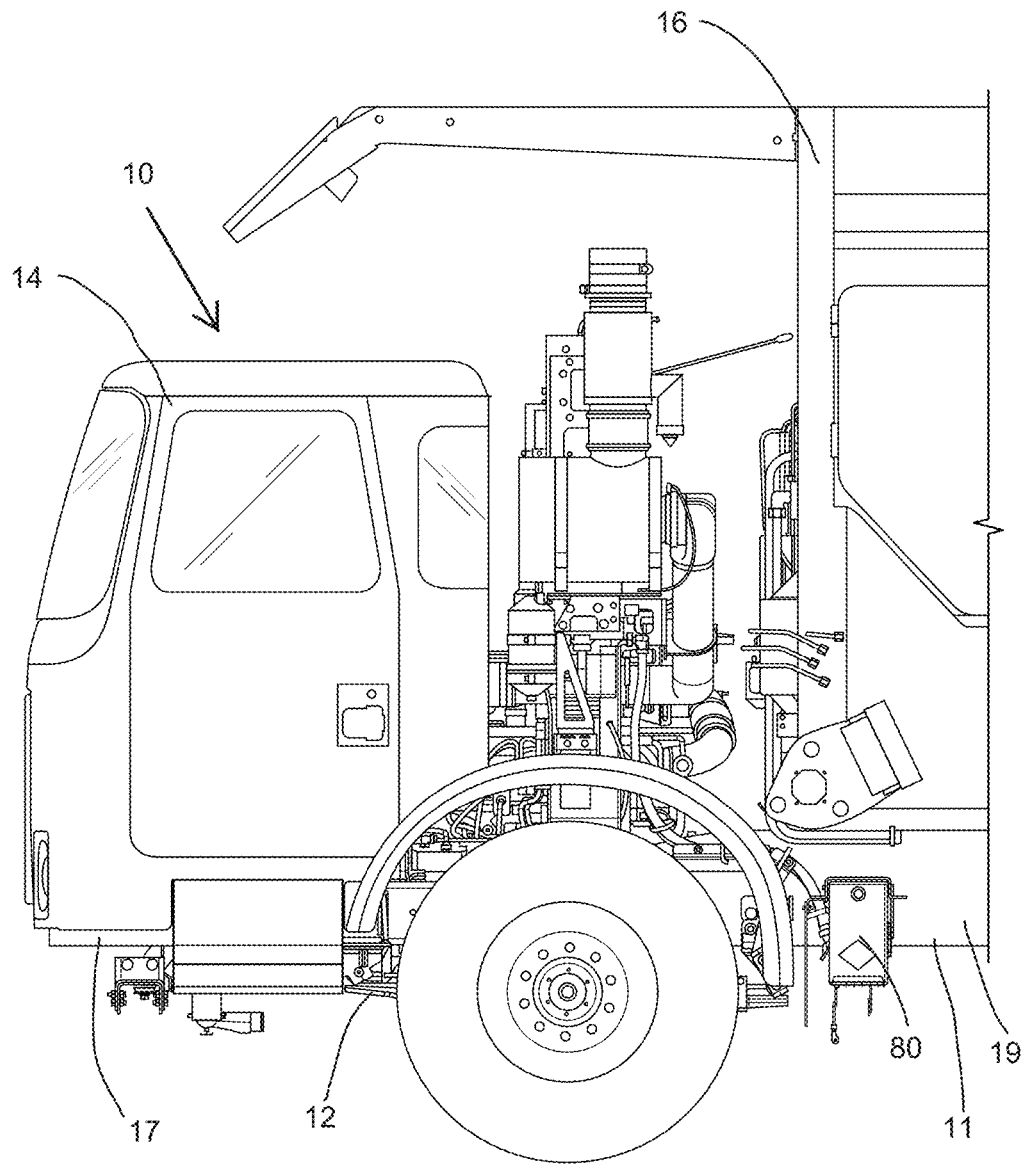
FIG. 2 is a side view of a portion of a vehicle according to one embodiment of the present invention in the form of a refuse truck.
Figure 3:
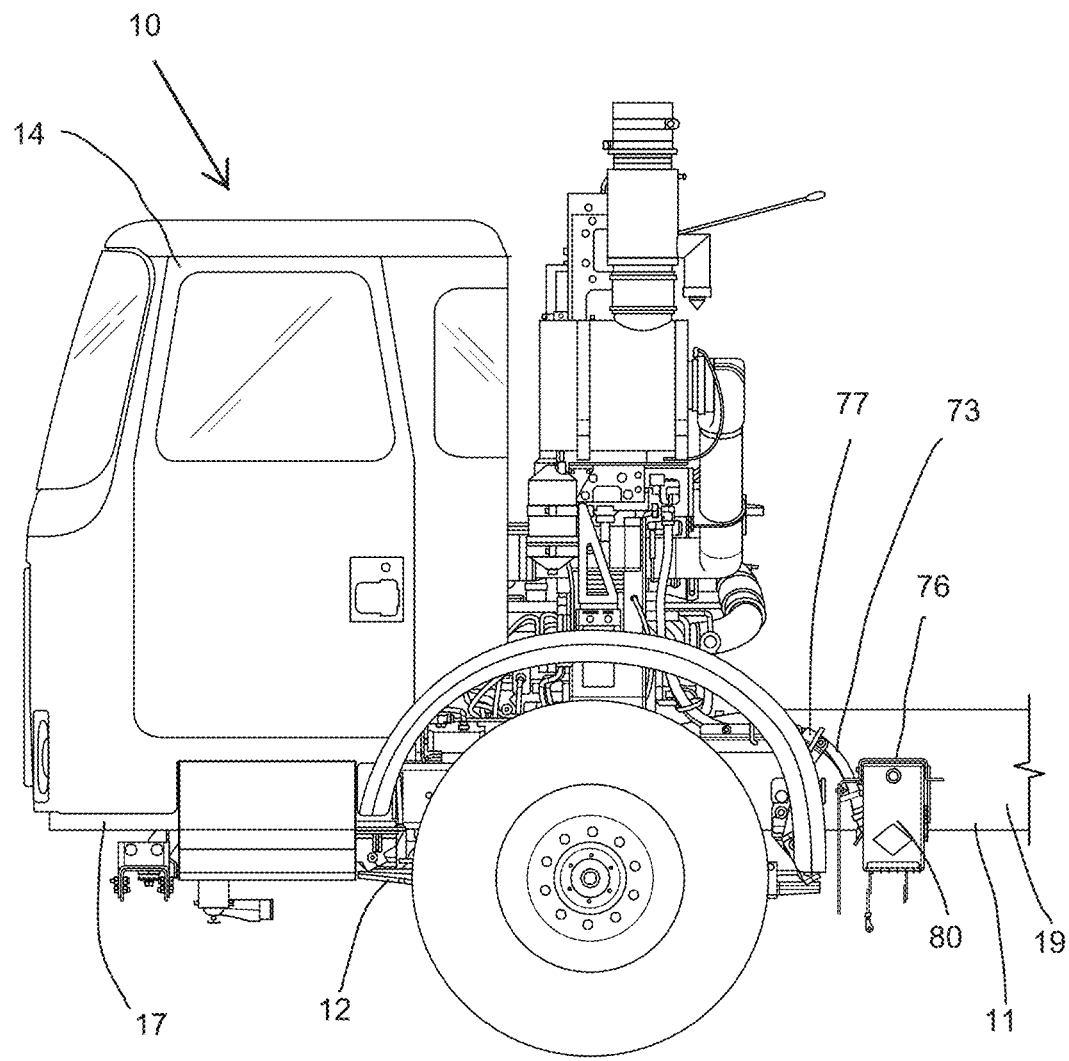
FIG. 3 is a side view of the portion of the vehicle shown in FIG. 2, with no body connected to the chassis.

It is understood that certain components may be removed from the drawing figures in order to provide better views of internal components.

DETAILED DESCRIPTION

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

Referring now in detail to the Figures, FIG. 1 discloses a vehicle of the present invention, generally designated with the reference numeral 10. In one embodiment, the vehicle is in the form of a refuse hauling truck. It is understood that aspects and features of the present invention can be incorporated into various types of vehicles including other heavy-duty vehicles, medium-duty vehicles or light-weight vehicles of various applications.

The truck 10 generally includes a chassis 12 supporting an operator cab 14 and a vehicle body 16. When assembled, the body 16 and the operator cab 14 are mounted on the chassis 12. The chassis 12 is a truck chassis and may have frame members or rail members 11, and the chassis 12 has a front portion 17 for supporting the operator cab 14 and a rear portion 19 for supporting the body 16. In one embodiment, the rail members 11 are made from steel and are generally rectangular in cross-section. The rail members 11 may extend substantially the entire length of the chassis 12 in one embodiment, and may serve as points of support and/or connection for the body 16, the cab 14, the axles 13, and other components. As is known in the art, the chassis 12 has a front axle 13 and one or more rear axles 13 which in turn are attached to wheels 40 for movement of the chassis 12 along a surface. Additionally, as shown in FIGS. 1-4, the vehicle 10 includes a drivetrain that includes an engine 94 connected to a transmission (not shown) configured to transfer power to at least one of the wheels 40. The transmission may be connected to one or both front wheels 40 in one embodiment, but it is understood that the transmission may be connected to transfer power directly to any number of the wheels 40, including, additionally or alternately, one or more of the back wheels 40 in some embodiments. It is understood that the transmission may allow shifting between several settings (e.g. D, N, R) and several gears (e.g. various forward-drive gear ratios). Additional components connected to the engine 94 may be included as well, including an exhaust pipe 45, an air cleaner assembly 46, a three-way catalyst 47, etc.

The chassis 12 may receive several different configurations of the body 16, having various functionalities. As illustrated in FIG. 1, in an exemplary embodiment for a refuse truck, the body 16 includes a storage area 34, a loading area (not shown), a reception area 38, an open hopper 39 and an articulating arm 122. Refuse 21 may be loaded in the reception area 38 by use of the articulating arm 122. Refuse is stored in the storage area 34 and generally compacted within the body 16. However, as understood by those of skill in the art, other bodies for different purposes such as front loaders, rear loaders, dump trucks, straight trucks, cement trucks, pumpers, sweepers and other applications may be used in connection with the present invention. Numerous components of the body 16 are capable of being adjusted, manipulated or otherwise actuated such as lifting the axles, manipulating the articulating arm 122, opening the hopper 39, and compacting.

The operator cab 14 generally includes an operator area, which in the embodiment illustrated, includes both a left operator area 50 and a right area 51. The right area 51 may be a right operator area in one embodiment, where the vehicle 10 may be operable in a left or right hand drive configuration and may be switchable between such configurations. In another embodiment, the vehicle 10 may be configured for only left hand or only right hand drive (e.g., for use in the UK), and may also include a side or rear passenger area, depending on the vehicle type. The operator cab 14 may also contain a dashboard 52 that includes controls for operating and monitoring the vehicle 10. The left operator area 50 has a seat 54 for the operator to sit and a left steering wheel 55, as well as an accelerator and a brake (not shown), for operating the vehicle 10 in a left hand drive configuration. The right area 51 may have a right steering wheel (not shown) in one embodiment, as well as an accelerator and a brake actuator (not shown), for operating the vehicle 10 in a right hand drive configuration. In this configuration, the right area 51 provides a standing area for the operator to stand, such as while driving short distances between stops to load refuse. The standing area may include sufficient width and height for the operator to stand while operating the vehicle 10. In this embodiment, the left operator area 50 has a swinging door 57 that closes to secure the operator in the cab 14. The right area 51 may have a similar door 57, or in a vehicle 10 configured for right hand drive, may have opening with a lockable or stowable door (not shown) that can be opened and locked into an open and/or stowed position, to allow the operator easy ingress and egress without the need to repeatedly open and shut the door.

One embodiment of the interior of an operator cab 14 is shown in FIG. 1A. As shown in FIG. 1A, the cab 14 may include one or more controls 41 that may include various switches, controls, meters, displays, etc., including for example an ignition switch, a speedometer and/or other monitors, and a transmission control (e.g. a stick or a push-button control), which may be located in the dashboard 52. The controls 41 may also include actuators for a main or service braking system, which may be air brakes in one embodiment, a parking brake system, or a throttle (e.g., an accelerator), as well as controls for lifting the axles, manipulating the articulating arm 122, opening the hopper 39, compacting, etc. At least some of such controls 41 may be integrated into and/or controlled by a vehicle control system 60, as described herein.

Figure 12:
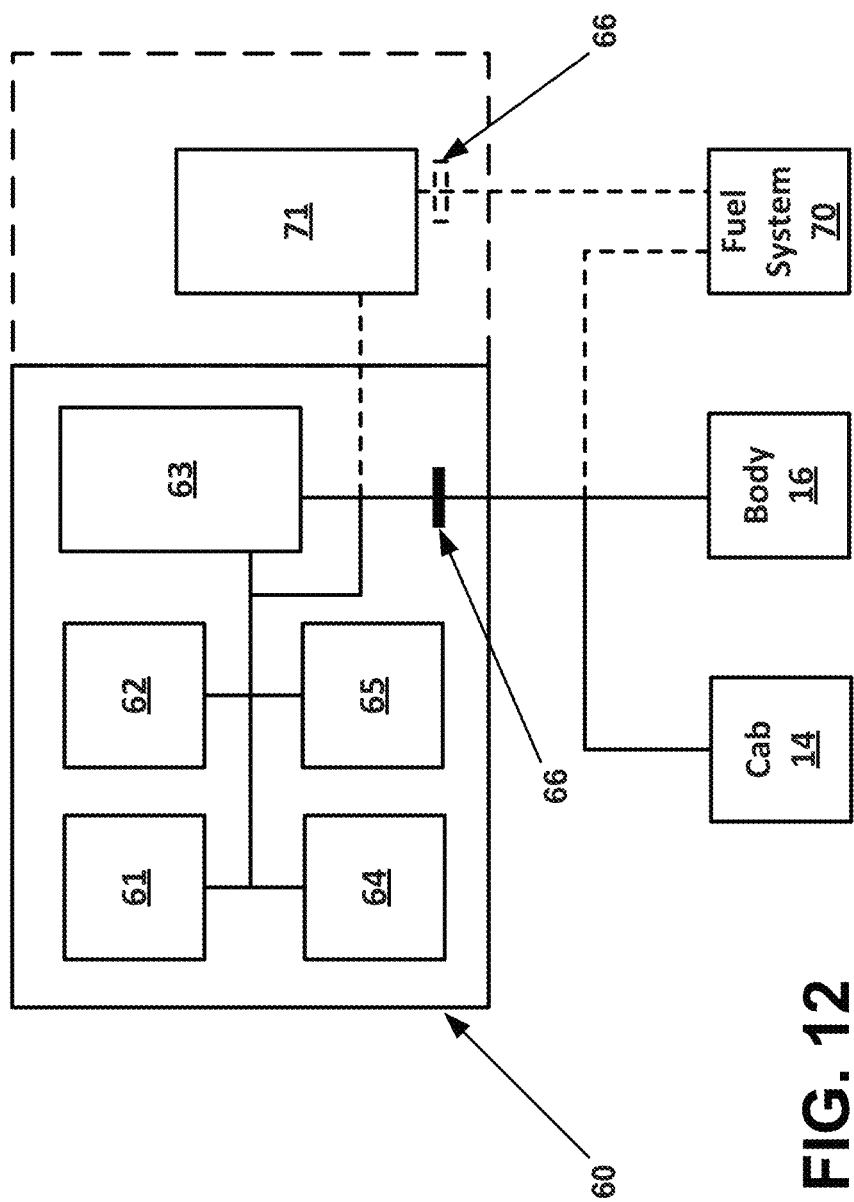
FIG. 12 is a schematic diagram of a vehicle control system and a fuel control system according to one embodiment of the present invention.

A vehicle such as the refuse truck 10 illustrated in FIGS. 1-1A may include a vehicle control system 60 configured for controlling one or more operating parameters of the vehicle 10, including one or more operating parameters of the cab 14, the body 16, the drivetrain, etc. The vehicle control system 60 may also be configured for monitoring and/or displaying various parameters related to the operation of the vehicle 10. One embodiment of a vehicle control system 60 is illustrated schematically in FIG. 12, and includes both cab controls 61 for controlling and/or displaying one or more operating parameters of the cab 14 and body controls 62 for controlling and/or displaying one or more operating parameters of the body 16. It is understood that the vehicle control system 60 may not include both cab and body controls 61, 62 in one embodiment. The vehicle control system 60 in FIG. 12 also includes a display 63 that is configured for displaying various parameters related to the vehicle 10. It is understood that the display 63 may be a single, integrated display in one embodiment, or may be a combination of various displays in another embodiment, potentially including combinations of video/digital and analog displays (e.g., a meter with a needle or other physical indicator). In one embodiment, the display 63 may comprise one or more LCD displays. The display 63 may further include equipment for audio display (e.g., an audible alarm or verbal indication), warning lights, sirens, and other mechanisms for communicating information to a user. At least a portion of the cab controls 61, the body controls 62, and or the display 63 may be accessible within the operator cab 14, such as on the dashboard 52. In one embodiment, at least a portion of the vehicle control system 60 may be accessible from outside the cab 14. The vehicle control system 60 may include necessary electronic hardware and software to perform its functions, including a processor 64, memory 65 (including RAM, ROM, digital storage, etc.), and an external connection 66 for connecting to other components of the vehicle 10 and sending/receiving data and instructions to and from such other components. It is understood that while a single processor 64, memory 65, and external connection 66 are shown in FIG. 12, various embodiments may include multiple processors, memories, external connections, etc. It is also understood that such components may take any forms known in the art, for example, the external connection 66 may include wired and/or wireless connections.

The vehicle control system 60 may further be connected to a fuel control system 71 as described herein, and in one embodiment, the fuel control system 71 may be integrated within the vehicle control system 60. In this configuration, the fuel control system 71 may not be considered a separate system, and may be considered to be part of a single, integrated vehicle control system 60. FIG. 12 illustrates that the fuel control system 71 may be integrated within the vehicle control system 60 and may utilize the same external connection 66 as the other components of the vehicle control system 60, or alternately, that the fuel control system 71 may be partially or entirely separate from the vehicle control system 60 and/or may utilize a different external connection 66. The fuel control system 71 may be connected to the fuel system 70 of the vehicle through either or both of such external connections 66. It is understood that the fuel control system 71 may control components of the fuel system 70 directly, such as by sending electronic instructions, or indirectly, such as by instructing an intermediate component to take actions, such as a hydraulic or pneumatic system.

Figure 9:
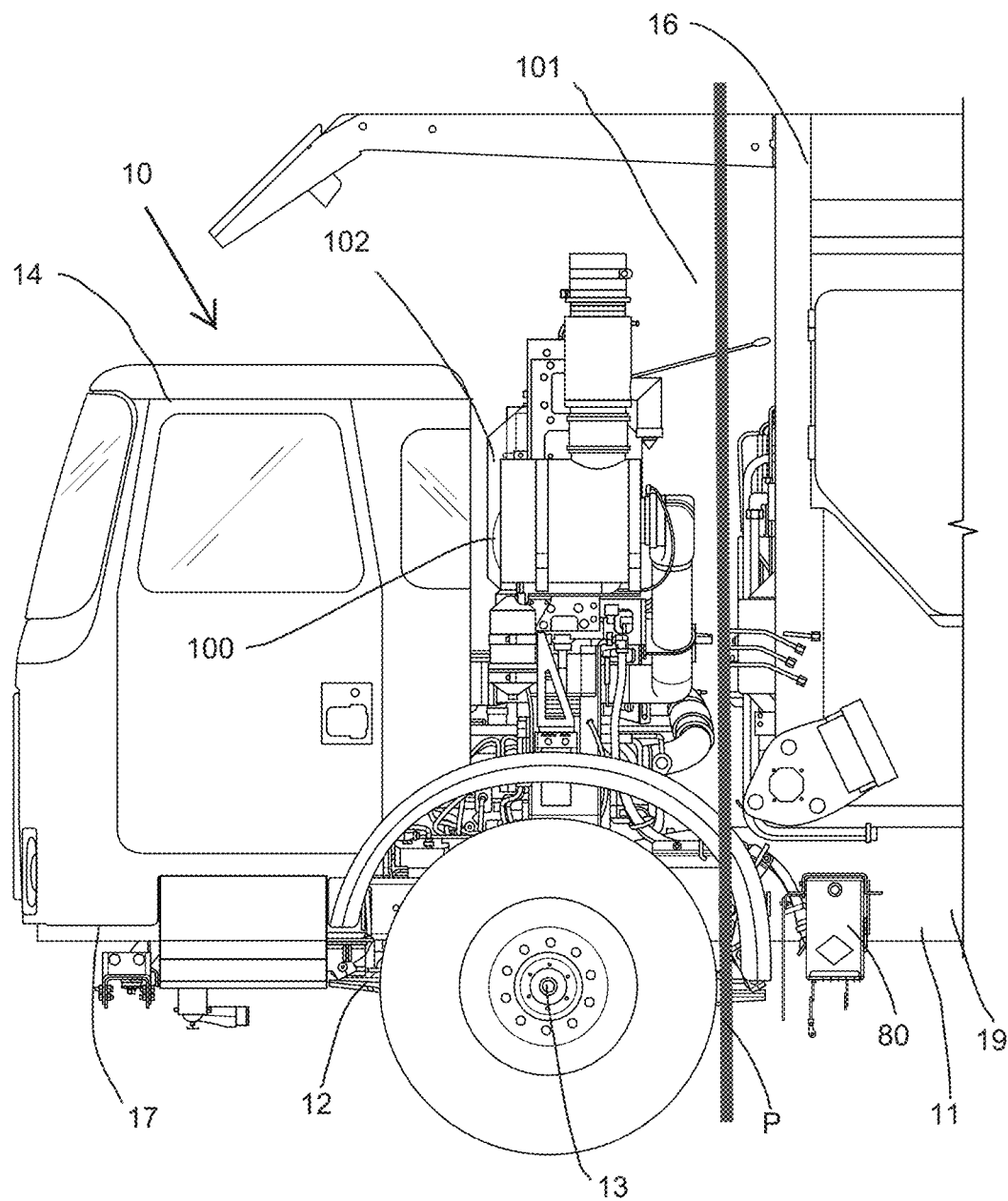
FIG. 9 is a side view of a portion of a vehicle according to one embodiment of the present invention in the form of a refuse truck.
Figure 10:
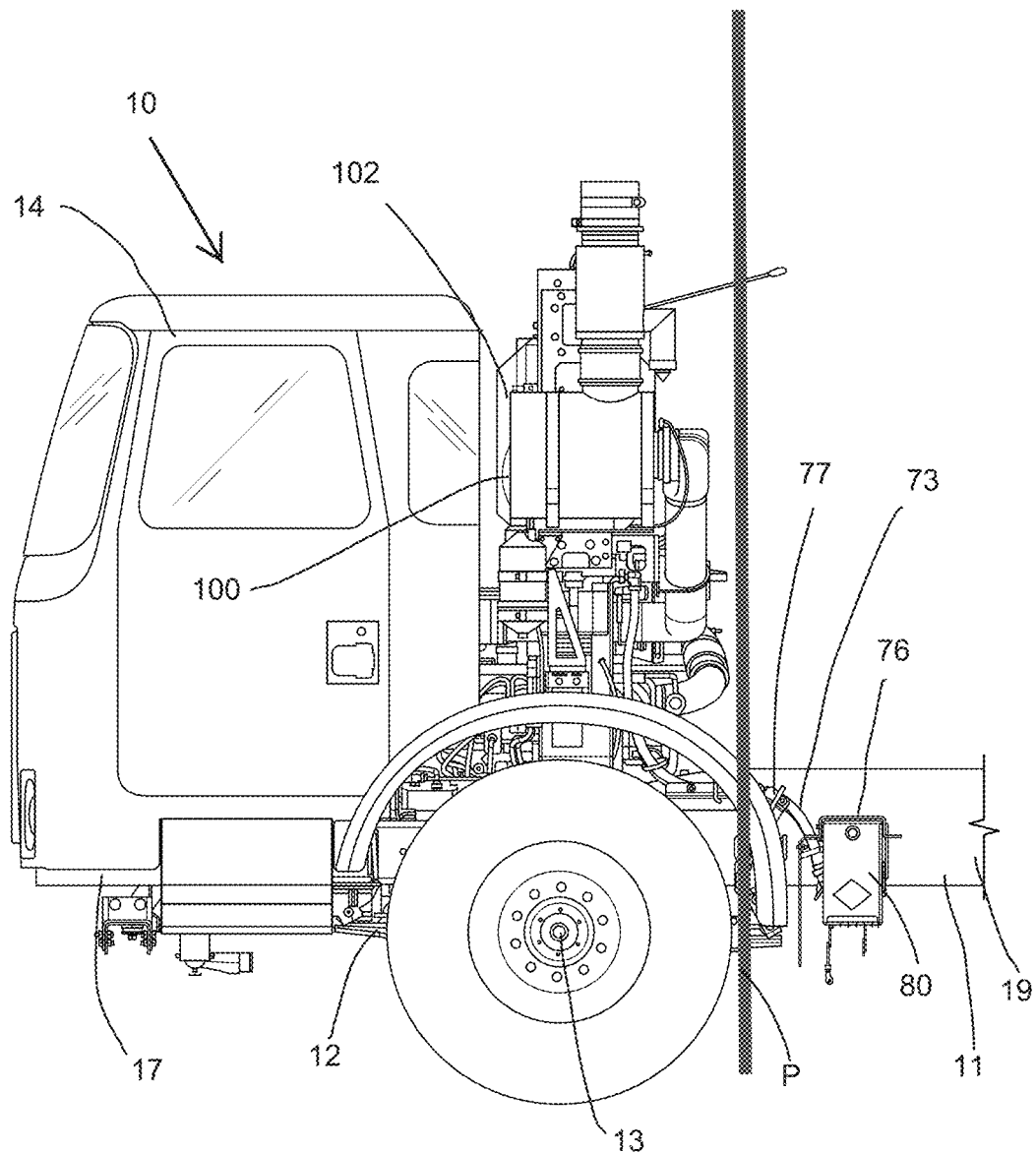
FIG. 10 is a side view of the portion of the vehicle shown in FIG. 9, with no body connected to the chassis.
Figure 11:
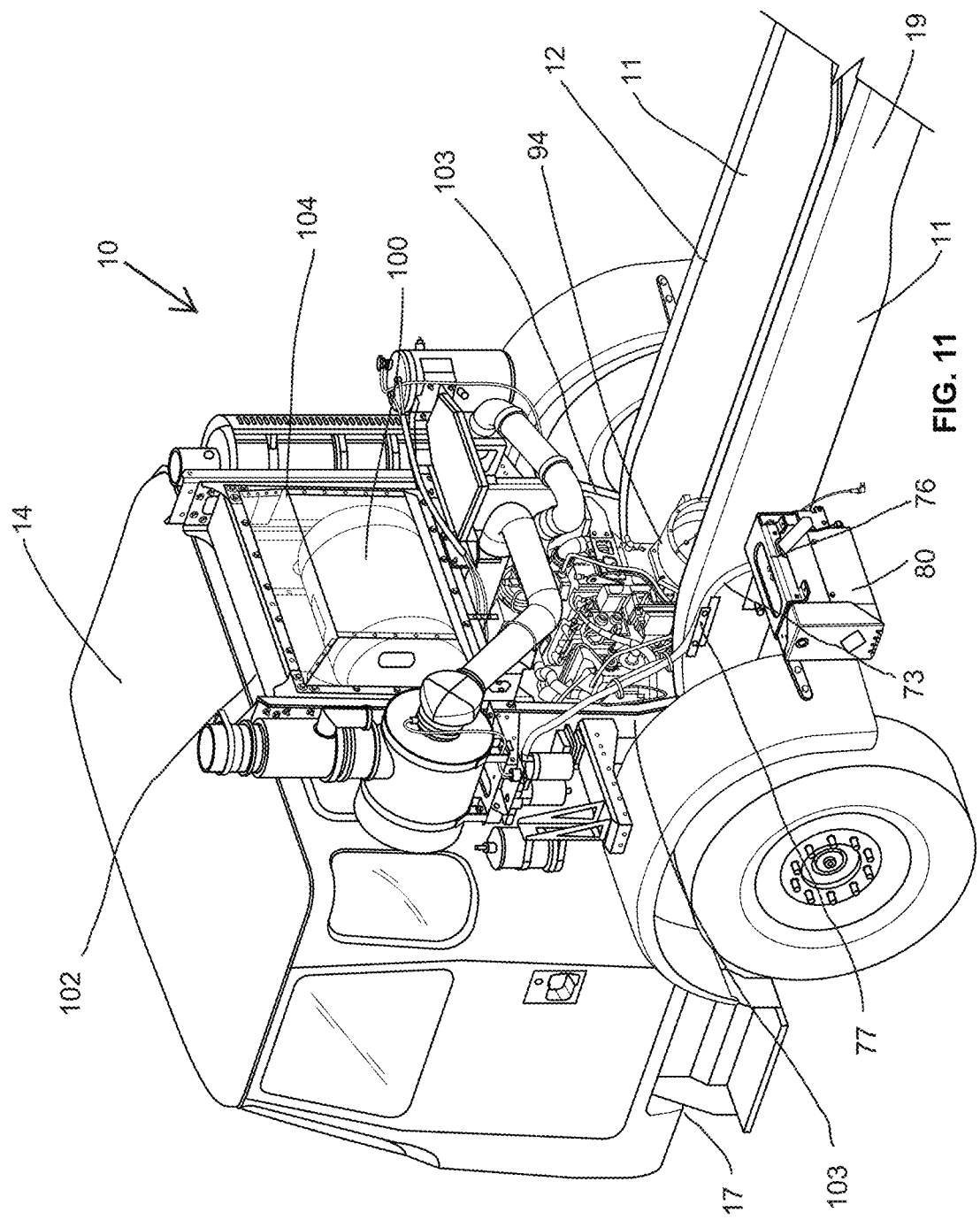
FIG. 11 is a rear perspective view of a portion of the vehicle shown in FIG. 10.
Figure 13:
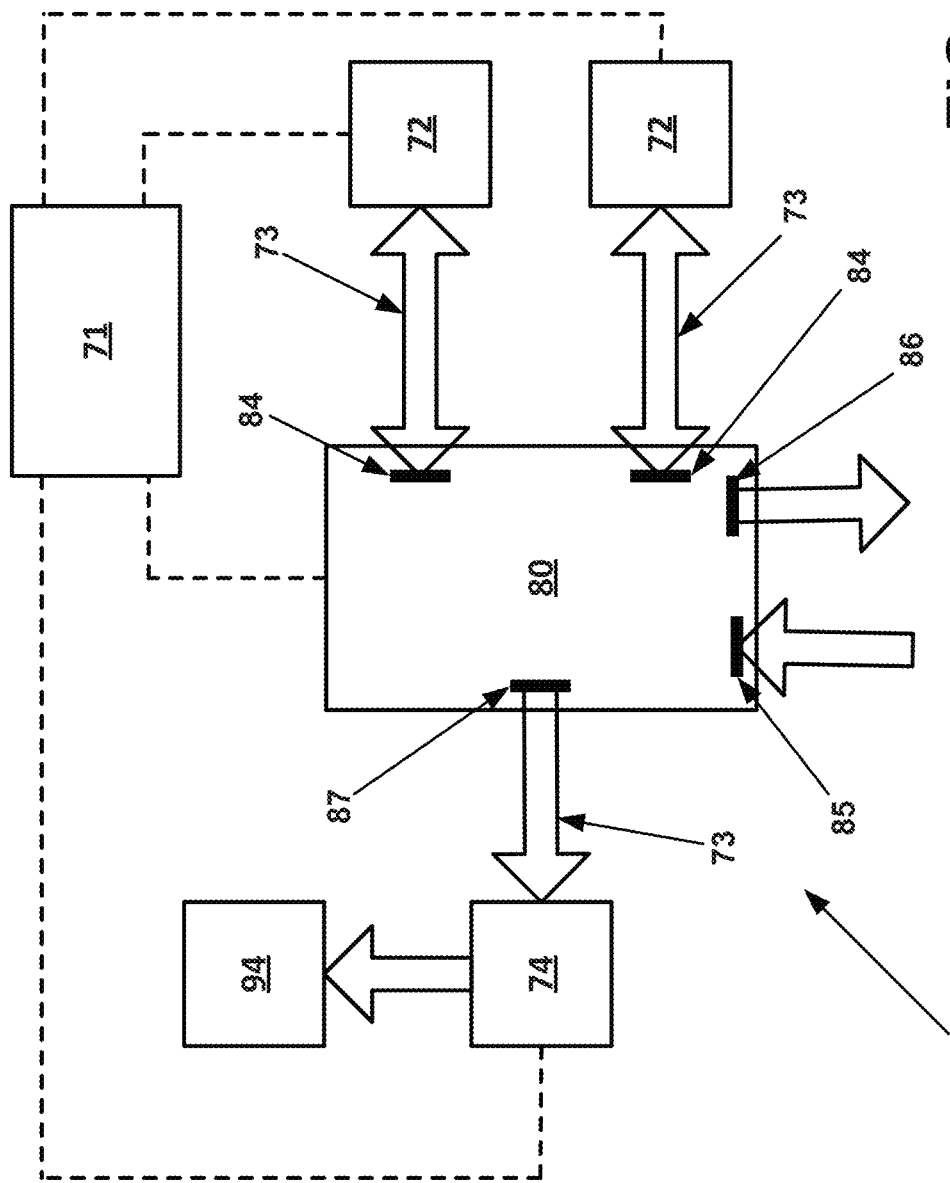
FIG. 13 is a schematic diagram of a fuel system according to one embodiment of the present invention.

One embodiment of the fuel system 70 of the vehicle 10 is illustrated schematically in FIG. 13, and may contain additional components, including one or more fuel tanks 72, conduits 73 connecting the fuel tanks 72 to other components, a fuel filter 74, and a fuel management module 80, as well as various brackets and mountings for supporting components of the fuel system 70. The vehicle 10 may include one or multiple fuel tanks 72 in different embodiments. In one embodiment, the vehicle 10 may include one fuel tank 72 that is connected to and supported by the chassis 12 and another fuel tank 72 that is connected to and supported by the body 16. When the vehicle 10 contains multiple fuel tanks 72, the fuel system 70 may be configured to draw from both fuel tanks 72 simultaneously, or may alternately be configured to draw from only one tank 72 at a time, such that one fuel tank 72 is considered the "main" tank (i.e., from which fuel is currently being drawn) and another fuel tank 72 is considered to be a "reserve" tank (i.e., from which fuel is not being drawn). This configuration is described in further detail herein. The vehicle 10 may further include a temporary fuel tank 100, as shown in FIGS. 9-11 and described in greater detail herein. Fuel tanks 72, 100 as described herein generally store CNG under pressures of up to 3600 pounds per square inch (PSI), and thus, the tanks 72, 100 and the conduits 73 travelling to/from the tanks 72, 100 should have sufficient structural strength to withstand such pressures.

The fuel filter 74 is connected to the engine 94, and filters the fuel before the fuel is introduced into the engine 94. The engine 94 typically processes fuel at much lower pressure than the storage pressure in the fuel tanks 72, and thus, the fuel filter 74 may be a low-pressure fuel filter in one embodiment. It is understood that one or more conduits 73 may lead to the fuel filter 74 and/or from the fuel filter 74 to the engine 94.

Figure 4:
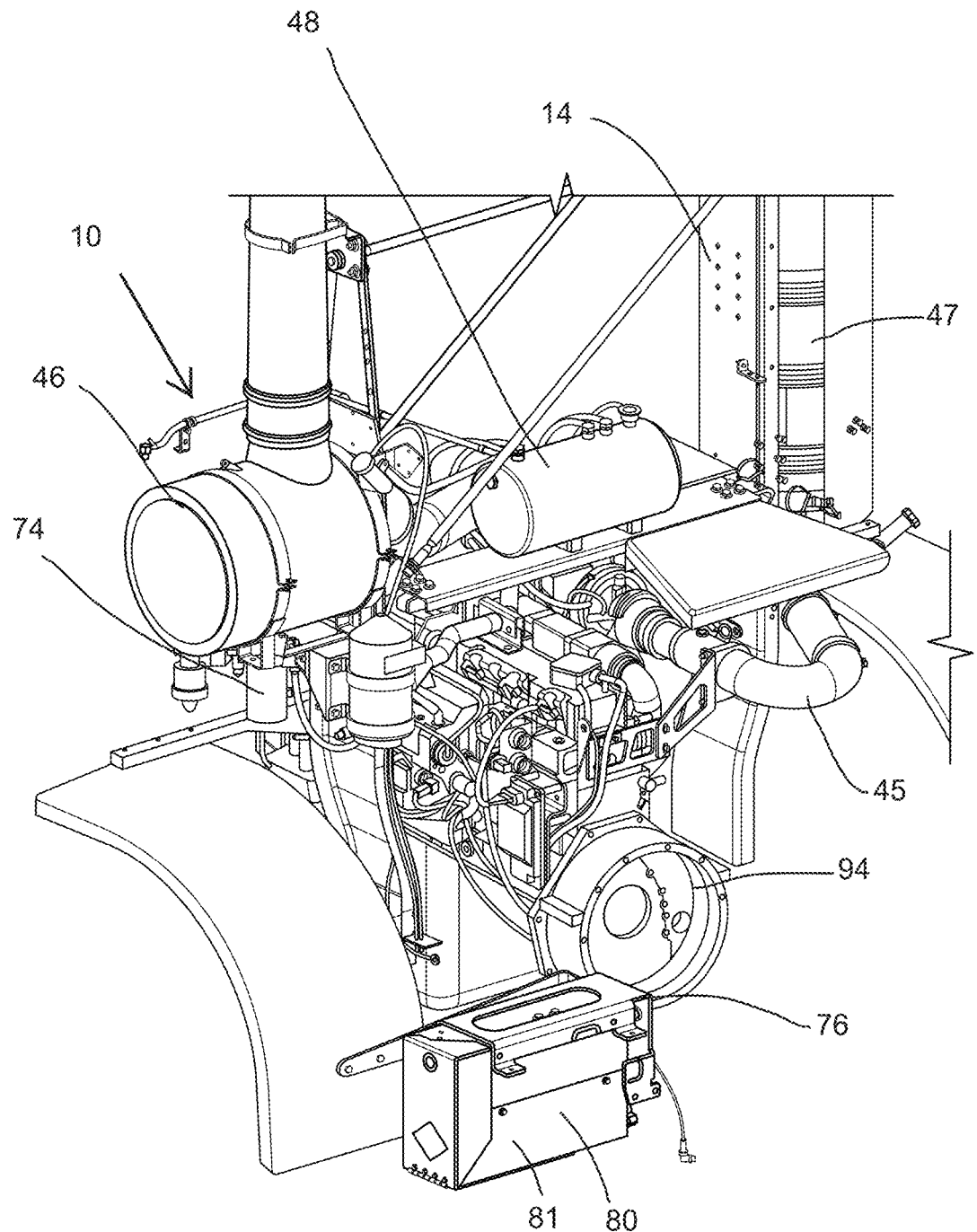
FIG. 4 is a rear perspective view of a portion of the vehicle shown in FIG. 3.
Figure 5:
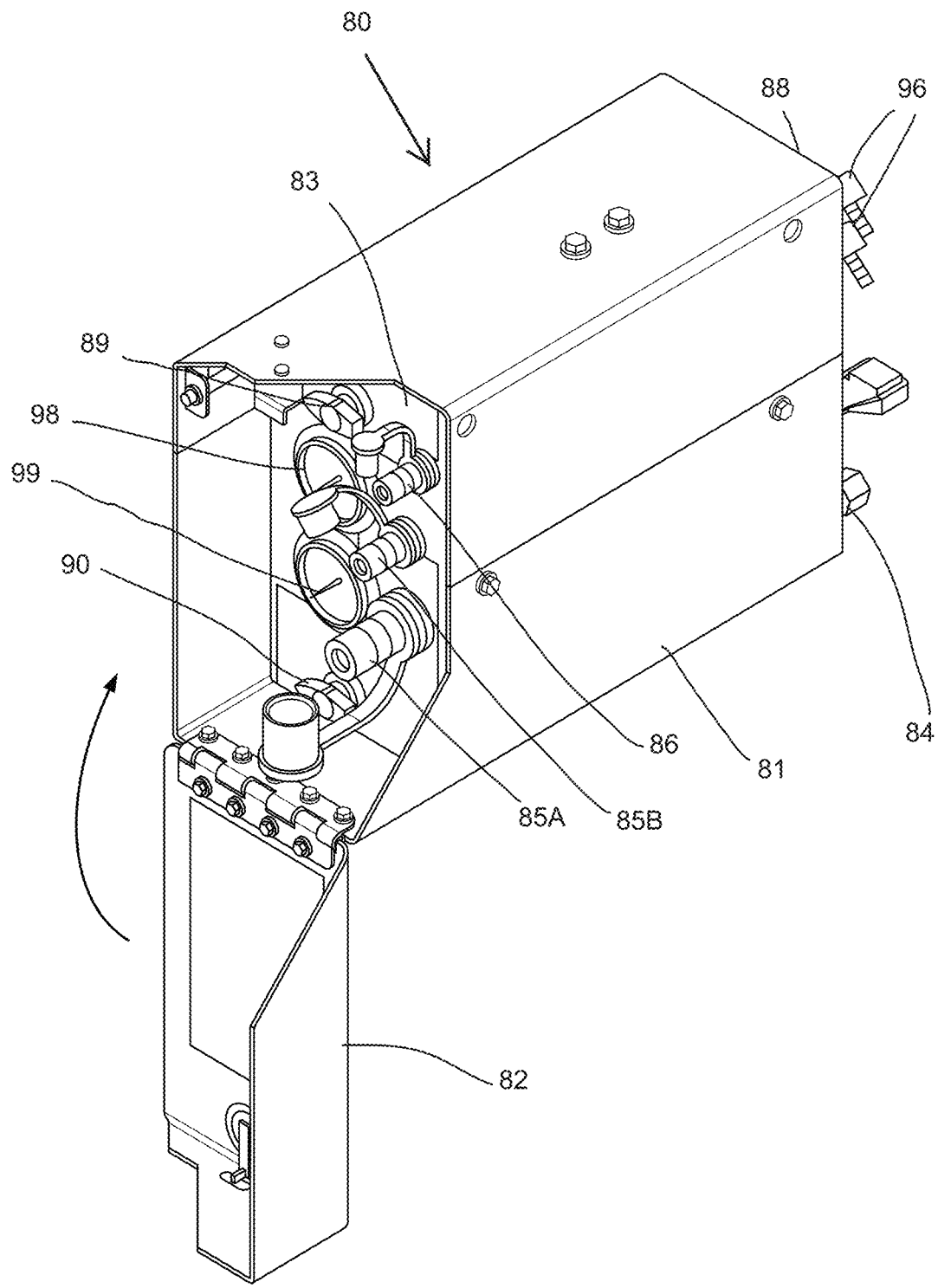
FIG. 5 is a front perspective view of a fuel management module according to one embodiment of the present invention.
Figure 7:
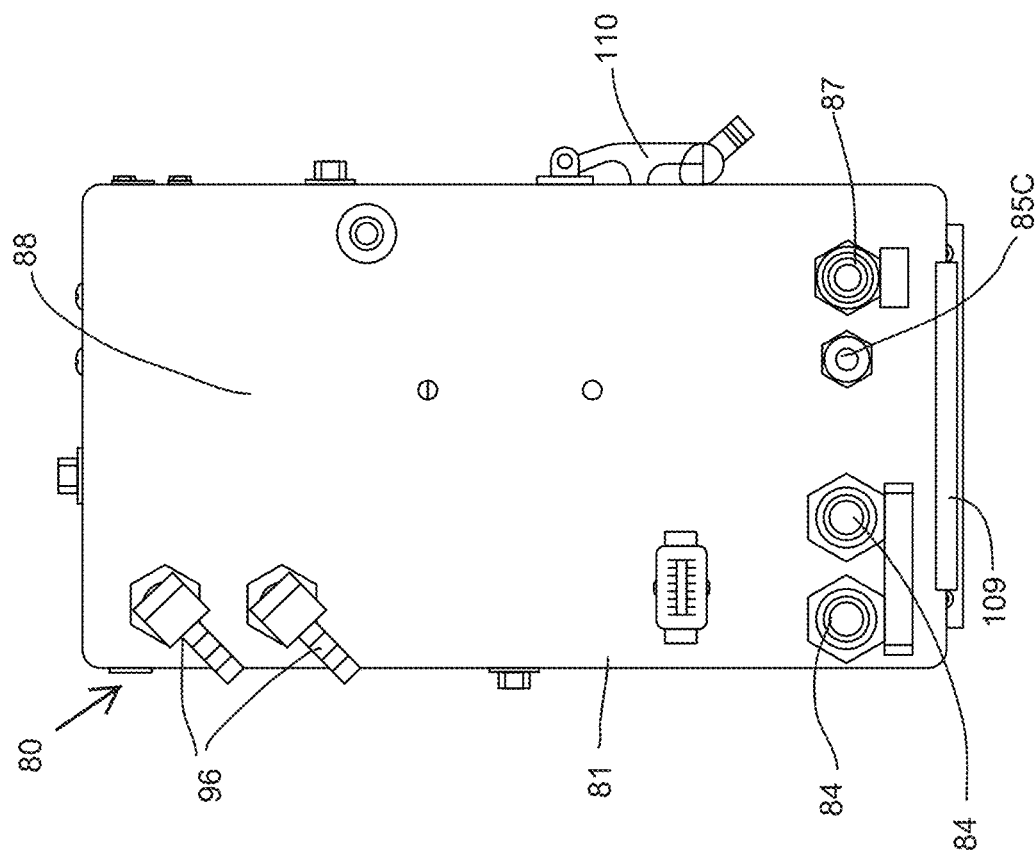
FIG. 7 is a rear view of the fuel management module of FIG. 5.
Figure 6:
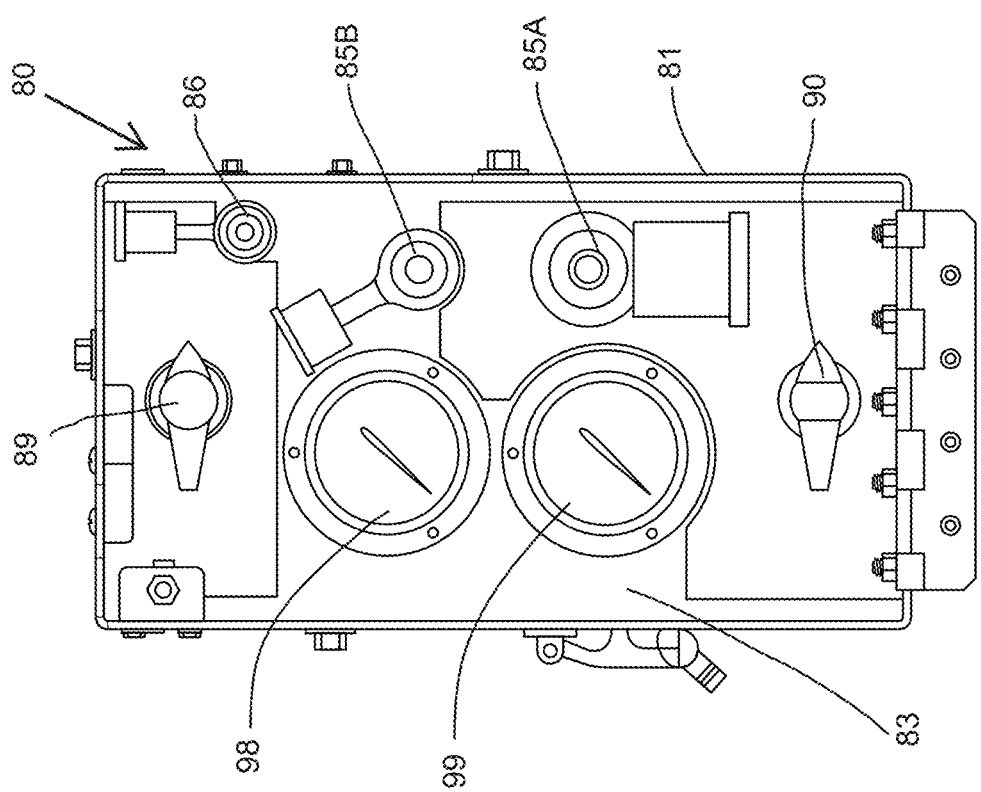
FIG. 6 is a front view of the fuel management module of FIG. 5.

The fuel management module (FMM) 80 is configured as a central point for management of the fuel within the fuel system 70, including filling and defueling the tank(s) 72 and transferring fuel from the tanks 72 to the engine 94 (and the fuel filter 74, if present). The FMM 80 is illustrated in greater detail in FIGS. 4-7, and the operation of the FMM 80 is illustrated schematically in FIG. 8. The FMM 80 as illustrated in FIGS. 4-7 includes a housing 81 with a hinged door 82 that can be opened and closed to at least partially cover and uncover a front panel 83 of the FMM 80. The door 82 is hinged along the bottom edge of the housing 81, such that the door 82 opens by swinging downwardly and closes by swinging upwardly. The housing 81 may further have a latch (not shown) or other structure for securing the door 82. The housing 81 and the door 82 may be formed of aluminum or a combination of steel and aluminum in one embodiment, in order to reduce weight, and may also be powder coated. The housing 81 may further be supported by a mounting bracket 76 that is connected to the chassis 12 to support the FMM 80, such as by connection to one of the chassis rails 11 as shown in FIG. 4. In this position, the FMM 80 offers little or no intrusion on the packaging volume of the body 16 or other components that may be supported by the rails 11 and installed by body outfitters. The FMM 80 includes a number of connections for connecting to different components of the fuel system 70. Such connections may include one or more high pressure connections 84 for connecting to one or more fuel tanks 72, one or more filling connections 85 for connection to external fuel filling apparatuses, one or more defueling connections 86 for connection to an external defueling receptacle, and a low pressure fuel output connection 87 for connection to the fuel filter 74 and the engine 94.

The FMM 80 in the embodiment of FIGS. 4-7 has two high pressure tank connections 84 that are configured for connection to a fuel tank 72, such as by connection to a conduit 73 extending to the fuel tank 72. The tank connections 84 are configured for "plug and play" connection, and a fuel tank 72 may be connected to either of the tank connections 84. The use of two tank connections 84 permits the simultaneous and/or selective use of multiple fuel tanks 72, in contrast to existing fuel systems that can only use one fuel tank at a time. This, in turn, provides increased options for fuel tank placement and configuration, such as using one tank 72 mounted on the chassis 12 and another tank 72 mounted elsewhere, e.g., the body 16, as well as addition of a desired amount of additional fuel storage capacity beyond what is installed by the OEM. The use of two tank connections 84 also permits the optional connection of a second fuel tank 72 when only one tank 72 is being used. For example, a temporary fuel tank may be used for moving the vehicle 10 when the main tank 72 has run out of fuel, or before the vehicle 10 is fully assembled. The tank connections 84 can operate as both input connections and output connections. As an input connection, the tank connection 84 can receive fuel from the respective tank 72 for transfer to the engine 94. As an output connection, the tank connection 84 can transfer fuel received from a filling connection 85 to the respective tank 72. The tank connections 84 in the embodiment of FIGS. 4-7 are positioned on the back panel 88 of the housing 81 (opposite the front panel 83) and are not covered by the door 82, but may be positioned elsewhere in other embodiments.

Figure 8:
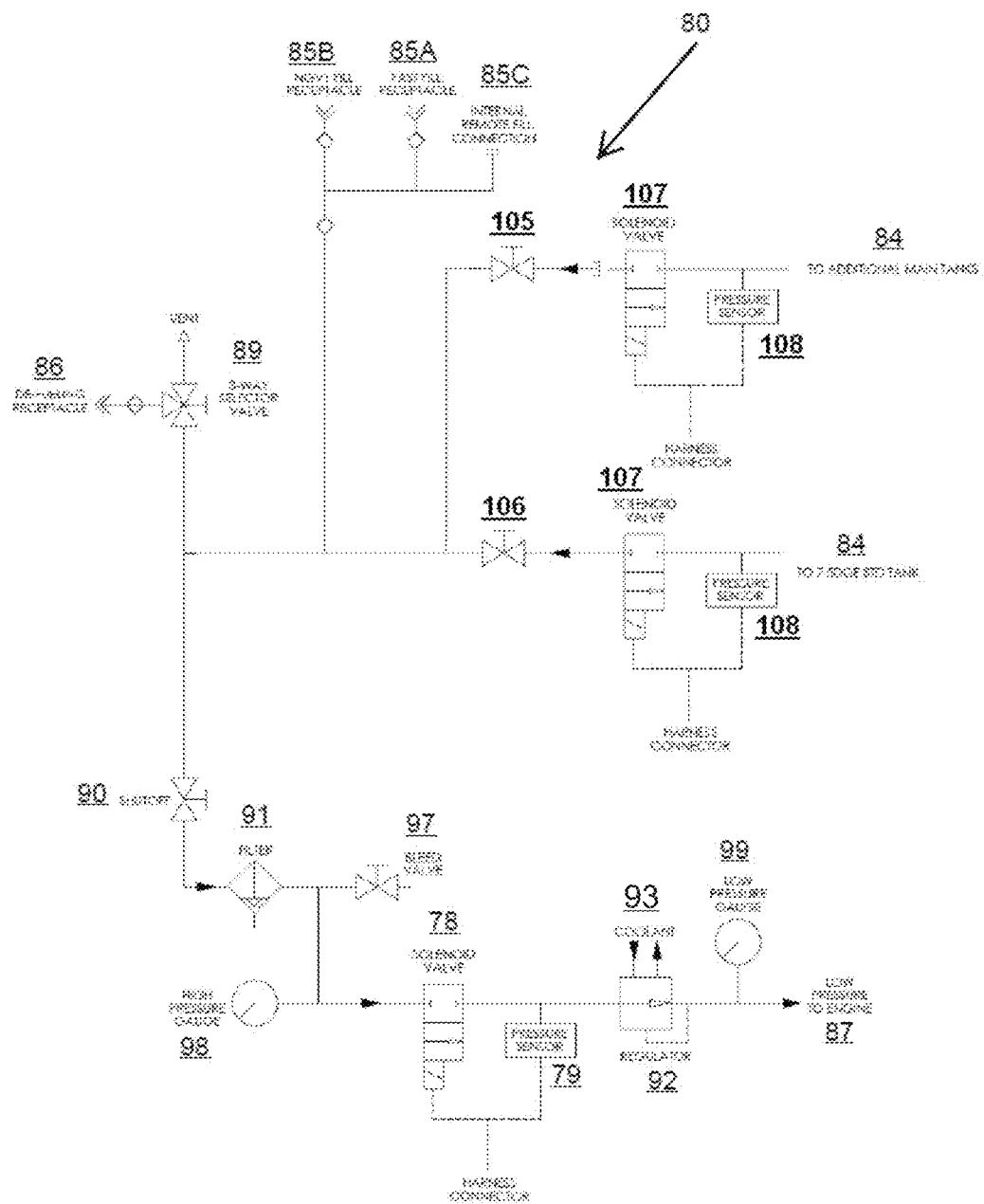
FIG. 8 is a schematic diagram of the connection and functioning of the fuel management module of FIG. 5.

The FMM 80 in the embodiment of FIGS. 4-7 has three filling connections or receptacles 85 that are configured for connection to filling apparatuses for filling the tank(s) 72. One filling connection 85A is a "fast fill" receptacle configured for connection to a fast fill apparatus. Such a fast fill receptacle 85A may have a minimum flow rate of 5000 standard cubic feet per minute (SCFM) at a pressure of 3000 pounds per square inch differential (PSID) and may have a connection end that is approximately 1.25 inches in diameter, in one embodiment. A second filling connection 85B is a "slow fill" receptacle configured for connection to a slow fill apparatus. Such a slow fill receptacle 85B may have a minimum flow rate of 1500 SCFM at a pressure of 3000 PSID and may have a connection end that is approximately 0.8 inches in diameter, in one embodiment. A fast fill process typically has similar fill rates to a standard diesel fill receptacle, except that only about a 75% of capacity fill is generally achieved because of heating and expansion of CNG during the fast fill process. A slow fill process achieves a much higher tank fill percentage, but requires much longer fill times, typically overnight. The fast fill receptacle is typically larger than the slow fill receptacle, to allow more rapid gas flow. A third filling connection 85C is a remote fill connection, which allows a remote fill point to be installed elsewhere on the vehicle 10 for various different filling configurations, such as after the FMM 80 leaves the OEM. The filling connections 85 are all in communication with the tank connections 84 to permit filling the tank(s) 72 through the filling connections 85, as illustrated in FIG. 8. In the embodiment illustrated in FIGS. 4-7, the fast and slow fill connections 85A-B are located on the front panel 83 of the housing 81, and the remote fill connection 85C is located on the back panel 88 of the housing 81, but any of such connections may be positioned elsewhere in other embodiments.

The FMM 80 in the embodiment of FIGS. 4-7 has a single defueling connection 86 that is in communication with the tank connections 84 and is configured for connection to a defueling receptacle (not shown) for defueling the tank(s)

72. The defueling connection 86 in the embodiment of FIGS. 4-7 is positioned on the front panel 83 of the housing 81, but may be positioned elsewhere in other embodiments. The FMM 80 also includes a defueling control valve 89, which is a three-way valve in one embodiment. Such a three-way valve 89 may be configured for selection between three operations: closed valve (i.e., no defueling, with normal operation), venting of CNG fuel trapped in the conduit between the valve 89 and the defueling receptacle 86, and defueling through the defueling connection 86. In the embodiment shown in FIGS. 4-7, the defueling control valve 89 is manually accessible on the front panel 83 of the housing 81, once the hinged door 82 is open.

If multiple fuel tanks 72 are used, the FMM 80 may be configured to permit selective defueling of a single selected tank 72 or multiple tanks 72 simultaneously through the defueling connection 86. Selective defueling or filling may be performed by opening and closing fuel valves, such as respective manual valves 105 and 106 located inside the FMM 80, shown in FIG. 8. If both manual valves 105, 106 are open, defueling of both tanks 72 can be commenced by the defueling control valve 89. If defueling of only one of the tanks 72 is desired, shutting one of manual valves 105, 106 permits the defueling control valve 89 to defuel only the selected tank 72. These valves 105 and 106 are schematically shown in FIG. 8, and these manual valves 105, 106 may be accessed through a service panel 109 on the FMM 80. In the embodiment shown in FIGS. 5-7, the service panel 109 is hinged and located on the bottom side of the FMM 80 and is accessible by use of a latch 110, however this service panel 109 may be accessible in a different manner and location in another embodiment. The service panel 109 can be used to access other internal components of the FMM 80, such as for changing a fuel filter. Further, the fuel control system 71 may include features that provide for automated selection of fuel tanks for defueling. In the embodiment of FIG. 8, the FMM 80 includes manual valves 105, 106 as well as automated fuel valves, such as solenoid valves 107, which may be controlled automatically by the fuel control system 71 and/or the vehicle control system 60. In this configuration, both manual valves 105, 106 may be left open, and the solenoid valves 107 can be selectively closed or opened to select specific fuel tank(s) 72 for defueling. It is understood that the manual valves 105, 106 and/or the solenoid valves 107 may also be used to control which fuel tank(s) 72 are used to supply the engine 94 with fuel. The manual valves 105, 106 may be replaced by solenoid valves 107 or other automated valves, however the use of manual valves 105, 106 provides increased safety in the fuel control system 71. Each fuel tank connection 84 is also connected to an individual pressure sensor 108 for detecting pressure (i.e., fuel level) in each individual tank 72, as described below. In another embodiment where more than two tank connections 84 are present, the FMM 80 may include additional valves 105, 106, 107 and/or pressure sensors 108 for each additional fuel tank connection 84.

The FMM 80 in the embodiment of FIGS. 4-7 has a single low pressure fuel output connection 87 for connection to the fuel filter 74 and the engine 94, such as through a conduit 73 leading to the fuel filter 74. Fuel may flow through the fuel output connection 87 to the engine 94 for combustion. A guide 77 may be used for holding the conduit 73 leading from the FMM 80 to the fuel filter 74, as shown in FIG. 4, and it is understood that the vehicle 10 may include similar guides for other conduits 73. The fuel output connection 87 positioned on the back panel 88 of the housing 81 and is not covered by the door 82, but may be positioned elsewhere in other embodiments.

The fuel output connection 87 is in communication with the fuel tank(s) 72 and the tank connections 84, and the FMM 80 includes internal components for regulating and depressurizing the fuel between the tank connections 84 and the fuel output connection 87. For example, the FMM 80 includes a shut-off valve 90 that can completely shut off the flow of fuel from the tank(s) 72 to the fuel output connection 87 and the engine 94. In the embodiment of FIGS. 4-7, this shut-off valve 90 is a manual valve accessible on the front panel 83 of the housing 81, and may be configured differently in other embodiments. The FMM 80 may also include a solenoid valve 78 and a pressure sensor 79 that are connected to the fuel control system 71 and/or the vehicle control system 60. The pressure sensor 79 can detect an aggregate fuel level in the system, i.e., the total fuel level in any tank(s) 72 that are currently connected to the system (assuming valves 78, 105, 106, 107 are open), which can then be electronically displayed in the operator cab 14 or elsewhere. The primary function of the solenoid valve 78 is to prevent flow through the fuel system when the engine 94 is turned off, as is required by National Fire Protection Association standards (i.e., NFPA 52). The solenoid valve 78 also permits fuel flow when the engine 94 is started and running. Further, the solenoid valve 78 may be linked to the pressure sensor 79 in the FMM 80 and can be automatically activated to regulate or shut down the flow of fuel to the fuel output connection 87 based on the pressure detected by the pressure sensor 79. The FMM 80 may further include a pressure regulator 92 that utilizes a coolant 93 for regulating the pressure of the fuel flowing to the fuel output connection 87 (see FIG. 8). The pressure regulator 92 addresses the difference in pressure of the high pressure fuel stored in the tank(s) 72 and the low pressure fuel delivered to the engine 94. The pressure regulator 92 may also be connected to the fuel control system 71 and/or the vehicle control system 60, and may be controlled by such systems, in various embodiments. The FMM 80 includes coolant connections 96 (see FIG. 7) to supply coolant 93 for the pressure regulator 92. The vehicle 10 may include a coolant expansion tank 48 (FIG. 4) and/or other coolant equipment. The FMM 80 may include still further components, such as an internal filter 91 and a bleed valve 97.

The FMM 80 may further include gauges, monitors, or other devices for use in monitoring the operation of the FMM 80. For example, the FMM 80 includes a high pressure gauge 98 for monitoring the pressure in the high pressure components of the FMM 80 and a low pressure gauge 99 for monitoring the pressure in the low pressure components of the FMM 80. The high pressure gauge 98 can display an aggregate fuel level in the system, i.e., the total fuel level in any tank(s) 72 that are currently connected to the system (assuming valves 105, 106, 107 are open). The gauges 98, 99 are positioned on the front panel 83 of the housing 81, such that they are covered by the door 82 when closed in one embodiment, but may be positioned elsewhere. The fuel control system 71 and/or the vehicle control system 60 may be connected to the FMM 80, and may display operating parameters of the FMM 80 as well.

The FMM 80 may further be connected with the fuel control system 71, as illustrated in FIG. 13, and the fuel control system 71 may receive information from the FMM 80 and/or control at least some of the operation of the FMM 80. For example, the fuel control system 71 may receive and/or display information detected by the pressure sensor 79, and may control operation of the solenoid valve 78, as mentioned above. As other examples, the fuel control system 71 may control the pressure regulator 92 or any of the various valves in the FMM 80, or may receive and/or display information detected by the pressure gauges 98,99. The fuel control system 71 and/or the vehicle control system 60 may also monitor and/or control other components of the fuel system 70. For example, as illustrated in FIG. 13, the fuel control system 71 may be connected to and in communication with the fuel tank(s) 72 and/or the fuel filter 74. The fuel control system 71 may detect and/or display the fuel level in each individual tank 72 e.g., by means of the pressure sensors 108, which may include separate displays for each tank 72 and/or an aggregate fuel display, in this configuration. Fuel levels in temporary tanks may also be detected and displayed by the fuel control system 71 in a similar manner. The fuel control system 71 may further permit for user selection of how the fuel level is displayed, e.g., individual tanks vs. aggregate, pressure vs. fuel level, etc. The fuel control system 71 may be able to detect faults and/or perform analysis/diagnostics on faults of various components of the fuel system 70. For example, the fuel control system 71 may set a fault code if the vehicle 10 is low on fuel or has run out of fuel. It is understood that sensors related to the fuel tank(s) 72 and other components may be utilized by the fuel control system 71 for these purposes in some embodiments. The fuel control system 71 may also provide further display options, enabling a user to select the manner in which specific parameters are displayed on the display 63.

The fuel control system 71 may also be configured to control operation of the fuel tanks 72 in one embodiment, such as controlling which of multiple fuel tanks 72 are currently used. In an embodiment having two fuel tanks 72, as illustrated in FIGS. 8 and 13, the fuel control system 71 may be configured for selecting one of the tanks 72 as a main tank (i.e., which is currently in use), leaving the other tank 72 as a reserve tank. The fuel control system 71 may then switch to the reserve tank 72 when the main tank 72 is depleted of fuel. This switching may be done manually at any time, or by means of the solenoid valves 107, and the fuel control system 71 may additionally or alternately be configured for automated switching between the tanks 72 when the system detects that the main tank 72 is depleted, as described above. It is understood that the fuel system 70 may include a solenoid valve 107 in communication with the fuel control system 71 for this purpose, as described above. Further, the fuel control system 71 may be configured to control the FMM 80 to draw fuel from multiple tanks 72 individually or simultaneously. The fuel control system 71 may be configured to control and/or monitor other operating parameters of the fuel system 70 in further embodiments.

In one embodiment, the vehicle 10 may be provided from the OEM with a fuel tank 72 mounted on and supported by the chassis 12 and connected to the FMM 80 by a conduit 73 connected to the tank connection 84, and with the FMM 80 connected to the fuel filter 74 by another conduit 73 extending from the fuel output connection 87. The vehicle 10 in this configuration also includes an engine 94, a transmission, wheels 40, and axles 13, and may also include an operator cab 14. In this configuration, the vehicle 10 is provided with a working fuel system 70 that is completely sealed from the fuel tank 72 to the engine 94. Such a complete, sealed installed fuel system 70 can be functionally tested at the OEM before shipping to a body outfitter, which can reduce or eliminate potential system downtime and later fault diagnostics/analysis. Any potential issues can be addressed to a single point of contact for maintenance, repair, and/or replacement as well. The sealed fuel system 70 can also reduce the risk of contamination or dirt ingress into the fuel system 70 during installation of the body 16 or other components. Further, such an installed fuel system 70 can permit the engine 94 to be used to move the vehicle 10 before installation of the body 16 and/or other components. The vehicle 10 provided from the OEM may further include a vehicle control system 60, with the fuel control system 71 integrated into the vehicle control system 60 and connected to the currently installed components of the fuel system 70. The vehicle control system 60 may have a panel display within the operator cab 14 (e.g., as a part of controls 41), which may include a variety of features, including controls for automatically controlling components of the vehicle 10, displays for displaying parameters of the vehicle 10 and its components, and other features. In an embodiment where the fuel control system 71 is integrated into the vehicle control system 60, the panel display may be configured controlling various features of the fuel control system 71 (e.g., solenoid valves 78, 107), displaying various parameters of the fuel control system 71 (e.g., readouts from pressure sensors 79, 108), and/or otherwise interacting with the fuel control system 71. It is understood that the vehicle control system 60 may include connections (e.g., one or more harnesses) that are configured for connection to components that may be subsequently installed, such as the body 16 and related components, or an additional fuel tank 72.

In an additional embodiment, illustrated in FIGS. 9-11, the vehicle 10 may include a temporary fuel tank 100 installed on the chassis 12 during manufacturing. The temporary fuel tank 100 in the illustrated embodiment is located behind the back surface of the operator cab 14 and within a gap 101 between the cab 14 and the front of the body 16. The vehicle 10 also includes mounting structure 102 for mounting and supporting the temporary fuel tank 100. In general, the temporary fuel tank 100 and the mounting structure 102 are installed before installation of the body 16, and do not extend rearwardly to a point where they may interfere with installation of the body 16 and/or operation of components associated with the body 16. For example, in one embodiment, no portion of the temporary fuel tank 100 or the mounting structure 102 extends more than 23 inches rearwardly of the front axle 13. In other words, no portion of either structure extends rearwardly beyond a vertical plane P that is perpendicular to the front axle 13 and perpendicular to a level surface upon which the vehicle 10 sits, which is located 23 inches rearward of the front axle 13.

The mounting structure 102 is connected to the chassis 12, and in one embodiment, includes two arms 103 connected to the chassis 12 and extending upward from the chassis 12, and a supporting structure 104 extending between the two arms 103 and supporting the temporary fuel tank 100. More specifically, in the embodiment illustrated in FIGS. 9-11, the two arms 103 of the mounting structure are connected to left and right sides of the chassis 12, and each arm 103 is connected to one of the two rails 11 of the chassis 12. The supporting structure 104 may be or include a casing that at least partially surrounds and engages the temporary fuel tank 100 to support the temporary fuel tank 100. Further, the arms 103 may be connected to the supporting structure 104 and/or the chassis 12 by bolt connections, as shown in FIG. 11, or may be connected using other techniques in other embodiments. In one embodiment, the front-to-back width of the supporting structure 104 is about 20 inches, the top-to-bottom height of the supporting structure 104 is about 33 inches, and the bottom of the supporting structure 104 is located about 37 inches from the bottoms of the arms 103. The width of the mounting structure 102 may be about 45 inches from one arm 103 to the other arm 103 in one embodiment.

The use of the temporary fuel tank 100 permits the vehicle 10 to be moved using engine power before manufacturing is complete, such as at the OEM during manufacturing (particularly before the main fuel tank(s) is/are installed) or after the product leaves the OEM. The temporary fuel tank 100 may be a Type 4 CNG tank with a capacity of 7.6 DGE, in one embodiment, which can provide sufficient fuel for mobility during manufacturing. Additionally, the temporary fuel tank 100 and the mounting structure 102 may be removed from the vehicle 10 after manufacturing is complete, or these components may remain connected to the vehicle 10 after the vehicle 10 is in use. The temporary fuel tank 100 may be connected to the FMM 80 through one of the tank connections 84, or the temporary fuel tank 100 may be connected to bypass the FMM 80, depending on the state of construction of the vehicle. A temporary fuel tank 100 may be installed in a different location or configuration in another embodiment.

It is understood that any features described herein with respect to specific embodiments may be utilized with any other embodiment described herein. Such features may be combined if required as well.

The fuel system 70 of the present invention provides benefits and advantages over existing designs. For example, as described above, the FMM provides increased options for customized installation of the fuel system. As another example, a complete and sealed tank-to-engine fuel system provides advantages in testing, function, maintenance, etc., for both the OEM and customers. Integration of the fuel control system with the vehicle control and display system allows for streamlined operation and control design, as well as installation of fuel system controls by the OEM, rather than by body outfitters or other parties in the manufacturing chain. Installation of fuel system controls by the OEM, in turn, provides the ability for more ergonomic and functional control layouts that are integrated into the appearance of the operator cab. Further, installation of the temporary fuel tank can provide advantages in mobility of the vehicle before assembly is complete. Still other benefits and advantages are explicitly or implicitly described herein and/or recognized by those skilled in the art.

While the specific embodiments have been illustrated and described, numerous modifications come to mind without significantly departing from the spirit of the invention, and the scope of protection is only limited by the scope of the accompanying Claims.

What is claimed is:

1. A vehicle comprising:
a chassis having a front portion supporting an operator cab and a rear portion configured for supporting a truck body, the rear portion having a pair of rails extending rearward from the front portion toward a rear of the vehicle;
an engine supported by the chassis and configured for utilizing CNG fuel;
a fuel management module comprising:
a housing mounted on one of the rails of the chassis;
first and second high pressure connections accessible on the housing, wherein each of the first and second high pressure connections is an input/output connection configured to permit filling and discharging the CNG fuel through the input/output connection, and wherein each of the first and second high pressure connections is configured for a plug and play configuration;
a filling connection accessible on the housing, the filling connection being in communication with the first and second high pressure connections, such that the filling connection is configured to receive input of fuel for filling the CNG fuel through the first and second high pressure connections; and
a low pressure fuel output connection accessible on the housing, the low pressure fuel output connection being in communication with the first and second high pressure connections for providing fuel output from the first and second high pressure connections,
wherein the fuel management module is further configured such that a fuel tank conduit is alternately connectable to either of the first and second high pressure connections to place the fuel tank conduit in communication with the filling connection and the low pressure fuel output connection via the first or second high pressure connection; and
an engine conduit connected to the low pressure fuel output connection and connected to the engine of the vehicle to provide output of CNG fuel discharged through the first and second high pressure connections to the engine through the low pressure fuel output connection.

2. The vehicle of claim 1, further comprising the fuel tank conduit and a first CNG fuel tank mounted on the chassis, wherein the fuel tank conduit connects the first fuel tank to the first high pressure connection of the fuel management module, wherein the first and is alternately connectable to the second high pressure connection, wherein the fuel tank conduit is configured for filling the first fuel tank with the CNG fuel received through the filling connection and for discharging the CNG fuel from the first fuel tank.

3. The vehicle of claim 2, further comprising a second CNG fuel tank mounted on the truck body, and a second fuel tank conduit connecting the second fuel tank to the second high pressure connection of the fuel management module and configured for outputting and receiving fuel to and from the second fuel tank, and wherein the first and second high pressure connections being in communication with the low pressure fuel output connection is further configured for transferring fuel from the second fuel tank to the engine, wherein the second fuel tank conduit is alternately connectable to the first high pressure connection.

4. The vehicle of claim 3, wherein the second fuel tank is a temporary fuel tank.

5. The vehicle of claim 1, wherein the fuel management module further comprises a defueling receptacle positioned on a front panel of the housing, the defueling receptacle configured for connection to defuel one or more fuel tanks of the vehicle through the first high pressure connection, and a defueling control valve configured for selecting among different operations of the defueling receptacle, wherein the defueling receptacle is further configured to be in communication with the fuel tank conduit.

6. The vehicle of claim 1, wherein the fuel management module further comprises at least a second filling connection accessible on the housing, the second filling connection being in communication with the first and second high pressure connections, such that the second filling connection is configured to receive input of fuel for filling the CNG fuel through the first and second high pressure connections wherein the second filling connection is configured to be in communication with the fuel tank conduit.

7. The vehicle of claim 6, wherein the filling connection is a fast fill connection and the second filling connection is a slow fill connection.

8. The vehicle of claim 1, wherein the fuel management module further comprises a pressure regulator in communication with the first and second high pressure connections and the low pressure fuel output connection and configured for regulating a pressure of CNG fuel discharged from the first and second high pressure connections through the low pressure fuel output connection.

9. The vehicle of claim 8, wherein the pressure regulator utilizes a coolant for regulating the pressure of the CNG fuel, and the fuel management module further comprises a coolant connection in communication with the pressure regulator and configured for supplying the coolant to the pressure regulator.

10. The vehicle of claim 1, wherein the fuel management module further comprises one or more valves configured for selectively connecting the first and second high pressure connections to the filling connection and the low pressure fuel output connection for filling or discharge.

11. The vehicle of claim 1, wherein the vehicle is a refuse truck, further comprising a refuse truck body supported by the rear portion of the chassis.

12. A refuse truck comprising:
a chassis having a front portion and a rear portion, the rear portion having a pair of rails extending rearward from the front portion toward a rear of the refuse truck;
an operator cab supported by the front portion of the chassis;
a refuse truck body supported by the rear portion of the chassis;
an engine supported by the chassis and configured for utilizing CNG fuel;
a fuel management module comprising:
a housing mounted on one of the rails of the chassis, the housing having an outer surface;
first and second high pressure connections accessible on the housing, wherein each of the first and second high pressure connections is an input/output connection configured to permit filling and discharging the CNG fuel through the input/output connection, and wherein each of the first and second high pressure connections is configured for a plug and play configuration;
a plurality of filling connections accessible on the housing, the filling connections being in communication with the first and second high pressure connections, such that the filling connections are configured to receive input of fuel for filling the CNG fuel through the first and second high pressure connections; and
a low pressure fuel output connection accessible on the housing, the low pressure fuel output connection being in communication with the first and second high pressure connections for providing fuel output from the first and second high pressure connections,
wherein the fuel management module is further configured such that a fuel tank conduit is selectively connectable to either of the first and second high pressure connections to place the fuel tank conduit in communication with the filling connections and the low pressure fuel output connection via the first or second high pressure connection; and
an engine conduit connected to the low pressure fuel output connection and connected to the engine of the refuse truck to provide output of CNG fuel discharged through the first and second high pressure connections to the engine through the low pressure fuel output connection.

13. The refuse truck of claim 12, further comprising the fuel tank conduit and a first CNG fuel tank mounted on the chassis, wherein the fuel tank conduit connects the first fuel tank to the first high pressure connection of the fuel management module and is alternately connectable to the second high pressure connection, and wherein the fuel tank conduit is configured for filling the first fuel tank with the CNG fuel received through the filling connections and for discharging the CNG fuel from the first fuel tank.

14. The refuse truck of claim 13, further comprising a second CNG fuel tank mounted on the truck body, and a second fuel tank conduit connecting the second fuel tank to the second high pressure connection of the fuel management module and configured for outputting and receiving fuel to and from the second fuel tank, and wherein the first and second high pressure connections being in communication with the low pressure fuel output connection is further configured for transferring fuel from the second fuel tank to the engine, wherein the second fuel tank conduit is alternately connectable to the first high pressure connection.

15. The refuse truck of claim 12, wherein the fuel management module further comprises a defueling receptacle positioned on a front panel of the housing, the defueling receptacle configured for connection to defuel one or more fuel tanks of the vehicle through the first and second high pressure connections, and a defueling control valve configured for selecting among different operations of the defueling receptacle, wherein the defueling receptacle is further configured to be in communication with the fuel tank conduit.

16. The refuse truck of claim 12, wherein the filling connections comprise a fast fill connection and a slow fill connection.

17. The refuse truck of claim 12, wherein the fuel management module further comprises a pressure regulator in communication with the first and second high pressure connections and the low pressure fuel output connection and configured for regulating a pressure of CNG fuel discharged from the first and second high pressure connections through the low pressure fuel output connection.

18. The refuse truck of claim 17, wherein the pressure regulator utilizes a coolant for regulating the pressure of the CNG fuel, and the fuel management module further comprises a coolant connection in communication with the pressure regulator and configured for supplying the coolant to the pressure regulator.

19. The refuse truck of claim 12, wherein the fuel management module further comprises one or more valves configured for selectively connecting the first and second high pressure connections to the filling connections and the low pressure fuel output connection for filling or discharge.

20. The refuse truck of claim 12, wherein the housing of the fuel management module further comprises a hinged door configured to be moved to cover and uncover a front panel of the housing, and wherein at least the filling connections are accessible on the front panel of the housing.

21. A refuse truck comprising:
a chassis having a front portion and a rear portion, the rear portion having a pair of rails extending rearward from the front portion toward a rear of the refuse truck;
an operator cab supported by the front portion of the chassis;
a refuse truck body supported by the rear portion of the chassis;

an engine supported by the chassis and configured for utilizing CNG fuel;

a fuel management module mounted on one of the rails of the chassis, comprising:

first and second high pressure connections, wherein each of the first and second high pressure connections is an input/output connection configured to permit filling and discharging the CNG fuel through the input/output connection;

a plurality of filling connections in communication with the first and second high pressure connections, such that the filling connections are configured to receive input of fuel for filling the CNG fuel through the first and second high pressure connections, wherein the filling connections comprise a fast fill connection and a slow fill connection;

a low pressure fuel output connection in communication with the first and second high pressure connections for providing fuel output from the first and second high pressure connections;

one or more valves configured for selectively connecting the first and second high pressure connections to the filling connections and the low pressure fuel output connection for filling or discharge;

a pressure regulator in communication with the first and second high pressure connections and the low pressure fuel output connection and configured for regulating a pressure of CNG fuel discharged from the first and second high pressure connections through the low pressure fuel output connection;

a defueling receptacle in communication with the first and second high pressure connections and configured for defueling CNG fuel discharged through the first and second high pressure connections; and a defueling control valve configured for selecting among different operations of the defueling receptacle, wherein the fuel management module is further configured such that a fuel tank conduit is selectively connectable to either of the first and second high pressure connections to place the fuel tank conduit in communication with the filling connections, the low pressure fuel output connection, and the defueling receptacle via the first or second high pressure connection; and an engine conduit connected to the low pressure fuel output connection and connected to the engine of the refuse truck to provide output of CNG fuel discharged through the first and second high pressure connections to the engine through the low pressure fuel output connection.

22. The refuse truck of claim 21, further comprising the fuel tank conduit and a first CNG fuel tank mounted on the chassis, wherein the fuel tank conduit connects the first fuel tank to the first high pressure connection of the fuel management module and is alternately connectable to the second high pressure connection, wherein the fuel tank conduit is configured for filling the first fuel tank with the CNG fuel received through the filling connections and for discharging the CNG fuel from the first fuel tank.

23. The refuse truck of claim 22, further comprising a second CNG fuel tank mounted on the truck body, and a second fuel tank conduit connecting the second fuel tank to the second high pressure connection of the fuel management module and configured for outputting and receiving fuel to and from the second fuel tank, and wherein the first and second high pressure connections being in communication with the low pressure fuel output connection is further configured for transferring fuel from the second fuel tank to the engine, wherein the second fuel tank conduit is alternately connectable to the first high pressure connection.

24. The refuse truck of claim 21, wherein the pressure regulator utilizes a coolant for regulating the pressure of the CNG fuel, and the fuel management module further comprises a coolant connection in communication with the pressure regulator and configured for supplying the coolant to the pressure regulator.

\* \* \* \* \*